(12) United States Patent
Rankin (10) Patent No.: US 11,430,010 B2
(45) Date of Patent: Aug. 30, 2022

(54) SYSTEM AND METHOD FOR INFLUENCING A PRIMARY TARGET THROUGH WORD-OF-MOUTH INTERACTION WITH SECONDARY TARGETS

(71) Applicant: John Rankin, Columbus, OH (US)

(72) Inventor: John Rankin, Columbus, OH (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

(21) Appl. No.: 16/804,767

(22) Filed: Feb. 28, 2020

(65) Prior Publication Data
US 2021/0042791 A1   Feb. 11, 2021

Related U.S. Application Data

(60) Provisional application No. 62/883,901, filed on Aug. 7, 2019.

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0255* (2013.01); *G06Q 30/0275* (2013.01); *G06Q 30/0276* (2013.01)

(58) Field of Classification Search
None
See application file for complete search history.

(56) References Cited

U.S. PATENT DOCUMENTS

| | | |
|---|---|---|
| 3,688,090 A | 8/1972 | Rankin |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 8,374,091 B2 | 2/2013 | Chiang |
| 8,397,151 B2 | 3/2013 | Salgado et al. |
| 9,350,663 B2 | 5/2016 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |

(Continued)

OTHER PUBLICATIONS

Chanchary et al., User Perception of Sharing, Advertising, and Tracking, 2015, USENIX Association, Symposium on Usable Privacy and Security (SOUPS) 2015, pp. 53-67 (Year: 2015).*

(Continued)

*Primary Examiner* — Naresh Vig
(74) *Attorney, Agent, or Firm* — Standley Law Group LLP; Jeffrey S. Standley; Adam J. Smith (57) ABSTRACT

Systems and methods for indirect advertising are disclosed. A real target is identified. Locations visited by the real target are identified. Secondary targets known to visit at least one of the identified locations are identified. A message designed to influence the real target is pushed to the secondary targets such that the real target may be influenced through word-of-mouth interaction with the secondary targets and led to believe that a larger phenomenon is occurring.

9 Claims, 6 Drawing Sheets

(56) References Cited

U.S. PATENT DOCUMENTS

| | | |
|---|---|---|
| 2003/0031198 A1 | 2/2003 | Currivan et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0028121 A1 | 2/2007 | Hsieh |
| 2007/0223395 A1 | 9/2007 | Lee et al. |
| 2010/0103830 A1 | 4/2010 | Salgado et al. |
| 2011/0149891 A1 | 6/2011 | Ramakrishna |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0018714 A1* | 1/2013 | George ............ G06Q 30/0277 705/14.16 |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0143586 A1* | 6/2013 | Williams ............ H04W 4/021 455/456.1 |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2014/0309923 A1 | 10/2014 | Ricci |
| 2015/0100613 A1 | 4/2015 | Osiecki et al. |
| 2015/0168175 A1* | 6/2015 | Abramson ............ G01C 21/34 701/408 |
| 2015/0229714 A1 | 8/2015 | Venkatsubra et al. |
| 2015/0241231 A1 | 8/2015 | Abramson et al. |
| 2016/0171399 A1 | 6/2016 | Santhanam et al. |
| 2016/0196577 A1* | 7/2016 | Reese .................. H04W 4/023 705/14.5 |
| 2016/0269294 A1 | 9/2016 | Rankin |
| 2016/0335659 A1* | 11/2016 | Lewis ............... G06Q 30/0244 |
| 2017/0067747 A1 | 3/2017 | Ricci |
| 2017/0090872 A1 | 3/2017 | Mathew et al. |
| 2018/0018147 A1 | 1/2018 | Sugawara |
| 2018/0102975 A1 | 4/2018 | Rankin |
| 2019/0156370 A1* | 5/2019 | Harrison ............ G06Q 30/0267 |
| 2020/0380563 A1* | 12/2020 | Shiffert ............. G06Q 30/0267 |

OTHER PUBLICATIONS

John et al., Ads That Don't Overstep, Jan. 2018, Harvard Business Review (Year: 2018).*

Method for predicting and targeting advertising to nearby customers on electronic map, Oct. 20, 2014, The IP.com journal (Year: 2014).*

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

* cited by examiner

SYSTEM AND METHOD FOR INFLUENCING A PRIMARY TARGET THROUGH WORD-OF-MOUTH INTERACTION WITH SECONDARY TARGETS

CROSS-REFERENCE TO RELATED APPLICATIONS

This application claims the benefit of U.S. non-provisional patent application Ser. No. 62/883,901 filed Aug. 7, 2019, the disclosures of which are hereby incorporated by reference as if fully restated herein.

TECHNICAL FIELD

Exemplary embodiments relate generally to systems and methods for indirect advertising, preferably by simulation of a social virality spiral.

BACKGROUND AND SUMMARY OF THE INVENTION

Modern advertisers often utilize social media to distribute and connect with potential customers. This is sometimes accomplished using paid advertisements that are presented on social media platforms such as Facebook, Twitter, and Pinterest. When users utilize these social media platforms, they are periodically presented with paid advertisements. These ads are often presented in the form of images or video clips and may be provided as GIFs, JPGs, or WAV files, to name a few examples. When the social media provider builds their web page or application for a browser or mobile device platform, the web page or application is generally designed to incorporate a variety of strategically placed ad spaces to be populated with paid advertisements. These ad spaces may appear along the top, bottom or sides of the user content, for example, and may act as billboard space.

The ad spaces are generally managed by a central provider which offers the space to advertisers who wish to connect with end users on the social media platform. The advertising process generally involves an offer to sell and an acceptance through a bidding process. In other words, the central provider generally presents the ad space for bidding when the mobile device initiates the application that contains the ad space. Once the ad space has been presented for bidding, potential advertisers compete to utilize the ad space opportunity.

Social Exchange Spiral

There are both negative and positive exchange spirals that relate to the passing of ideas and information amongst social participants. At its core, this is a simple concept where one individual exchanges information with someone else within their social network, and that person in turn further exchanges with others in their personal social network. The movement of this information generally flows away from the source.

A sufficiently enticing topic of information generates a concept known as "social currency." This term describes the personal value that is derived from individuals participating in social exchange. In other words, individuals find pleasure in being able to espouse information that may seem relevant or interesting. There is an increase in social standing and importance. Therefore, the social exchange spiral is driven by the desire to participate in social currency.

Proximity and the Mere Exposure Effect

Individuals form friendships or develop social networks with those they encounter frequently. This is a subset of the mere exposure effect, where people tend to develop positive feels towards objects and individuals that they see and interact with more frequently. This frequently is driven by the concept of proximity, where greater exposure occurs naturally with individuals who are simply closer more often; therefore, our social network grows out of our close friendships which can in turn develop from those we are closer to in proximity. Neighbors and classmates become friends and form the foundations for our growing social network.

While our close social connections can be established in a wide variety of contexts, the vast majority of our close associates can be identified by proximity observation. As these close associates import information within social exchange spirals, it is most often to these same proximity connections that the exchange takes place. Therefore, each interactive exchange occurs between members that have a social connect that has been developed through proximity and mere exposure. It is a chain of exchanges moving ever wider and ever farther from the point of origin.

What is needed are systems and methods which utilize these underlining aspects of modern advertising and capitalize on the more complex nature of human behavior, interest, and purchasing forces.

The disclosed systems and methods utilize elements of modern advertising and enhances it by creating the impression of a large social exchange that has gone viral. Rather than directly advertising to a target, the disclosed systems and methods achieves a word of mouth type of influence by advertising to the proximity social network and unwittingly creating advertising confederates. The disclosed systems and methods utilize bid/offer data to isolate and form support for a target message without directly revealing to the target recipient that the viral spiral only surrounds the target, and not necessarily the entire society.

One exemplary object of this invention is to deliver a more powerful and effective advertising message by creating a situation that drives word of mouth within a real target's social network. By utilizing bid/offer data that contains coordinates, the real target's movements may be tracked to identify secondary and tertiary targets which are frequently within a given proximity of the rear target. By forcing a selected message to the secondary and tertiary targets within the real target's social network, there will be the simulation of a viral social exchange spiral, by producing word of mouth exchanges between the social group and the real target. In this way, the advertising message will be delivered in a more effective manner.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY
EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
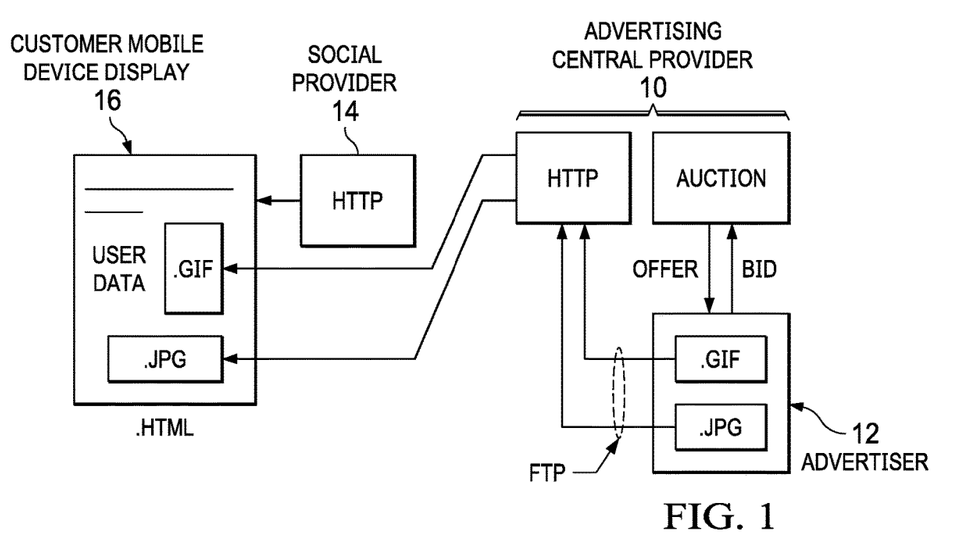
FIG. 1 illustrates exemplary modern advertising.

As illustrated in FIG. 1, an advertiser 12 may gain the ability to utilize ad space on a social medial platform 16 through a central provider 10. The advertiser 12 may be the successful bidder for a given ad space and may transmit files containing the advertisement to be provided to the central provider 10. The formats of such files may vary depending upon the requirements of the central provider 10 and/or the potential space limitations from the HTML document that will ultimately be displayed. Since the central provider 10 is generally the owner of the HTTP server that distributes the graphic advertising content containers located on the display HTML document, the central provider 10 may distribute the bid winner's 12 content for publication on the social media platform 16.

The social media platform 16 may comprise a number of pages. The pages may be HTML pages and may comprise of a number of dynamic objects, all of which may be provided by the same or different sources. When a social provider 14 designs the user data display, the social media provider 14 generally has a myriad of choices for display content. When the social media provider 14 contracts with a central provider 10 to sell parts of their user display for advertising, the central provider 10 generally provides content URLs that will be supplanted with the sold content. Therefore, these areas of the social media platform 16 may be dynamically changed and the central provider 10 may be provided with complete control over such displays.

Though some discussion is provided herein with regards to HyperText Transfer Protocol ("HTTP"), Uniform Resource Locators ("URL"), and/or Hypertext Markup Language ("HTML"), it is contemplated that other protocols, languages, and/or formats may be utilized.

Bid Offer Information and Geofencing

Figure 2:
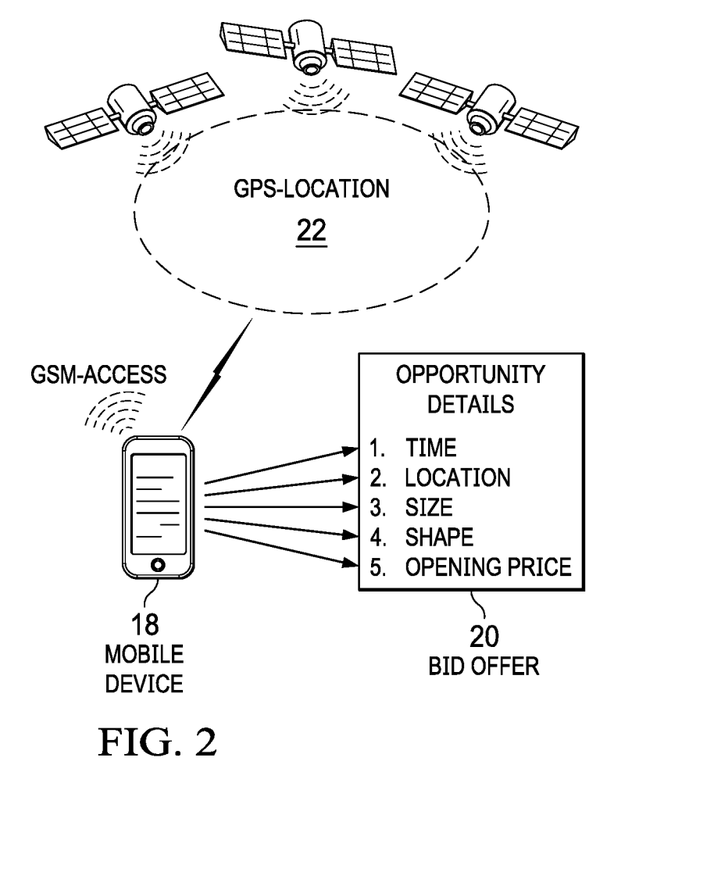
FIG. 2 illustrates exemplary advertising bidding.

The advertising opportunity that is put out for bids may contain specific details 20, as illustrated in FIG. 2. Such details 20 may comprise time, location, size, shape, opening price, some combination thereof, or the like of the advertising opportunity. The potential advertiser 12 may select one or more opportunities based upon these details 20. The size and shape of the advertising space generally controls selection based upon content choices; however, the time and location may be generally dynamically changing, and is generally based entirely upon the location of the mobile device 18. The bidding advertiser 12 starts to bid on the opportunity space at a beginning price and multiple bidders may compete until the closing opportunity moment. Since location, often in the form of latitude/longitude coordinates, may be available to the bidder, it is possible to select for one or more particular geographic areas. Other formats of location measurements may be utilized. Advertisers 12 are able to target their ads based upon where and when they want the ads to appear. Since the bid offer for mobile devices 18 may include location information, it is possible to confine advertising to various size and shape geographic areas. Furthermore, advertisers 12 may define a geographic polygon that surrounds a specific location for distribution of the advertising content.

This is sometimes referred to as "geofencing", where the advertiser 12 defines a confinement area 22 and only bids on opportunities within the confinement or geofence 22. For example, without limitation, a small Italian restaurant wanting to limit their advertising budget might geofence well known Italian restaurants within a short driving distance and advertise only to patrons of the other well-known Italian restaurants. A further example, without limitation, is geofencing a convention center that is holding a conference of quilters. During the conference, quilting supply companies could bid on opportunity space within mobile devices within the geofenced convention center.

Once a mobile device 18 has been identified by the central advertising provider 10 it may be assigned a unique identifier. This identifier may remain constant and connected with the specific owner or user of the mobile device. This may permit the advertiser 12 to monitor future bid offers to locate the unique identifier assigned to a particular mobile device 18 and provide follow-up advertising.

Figure 3:
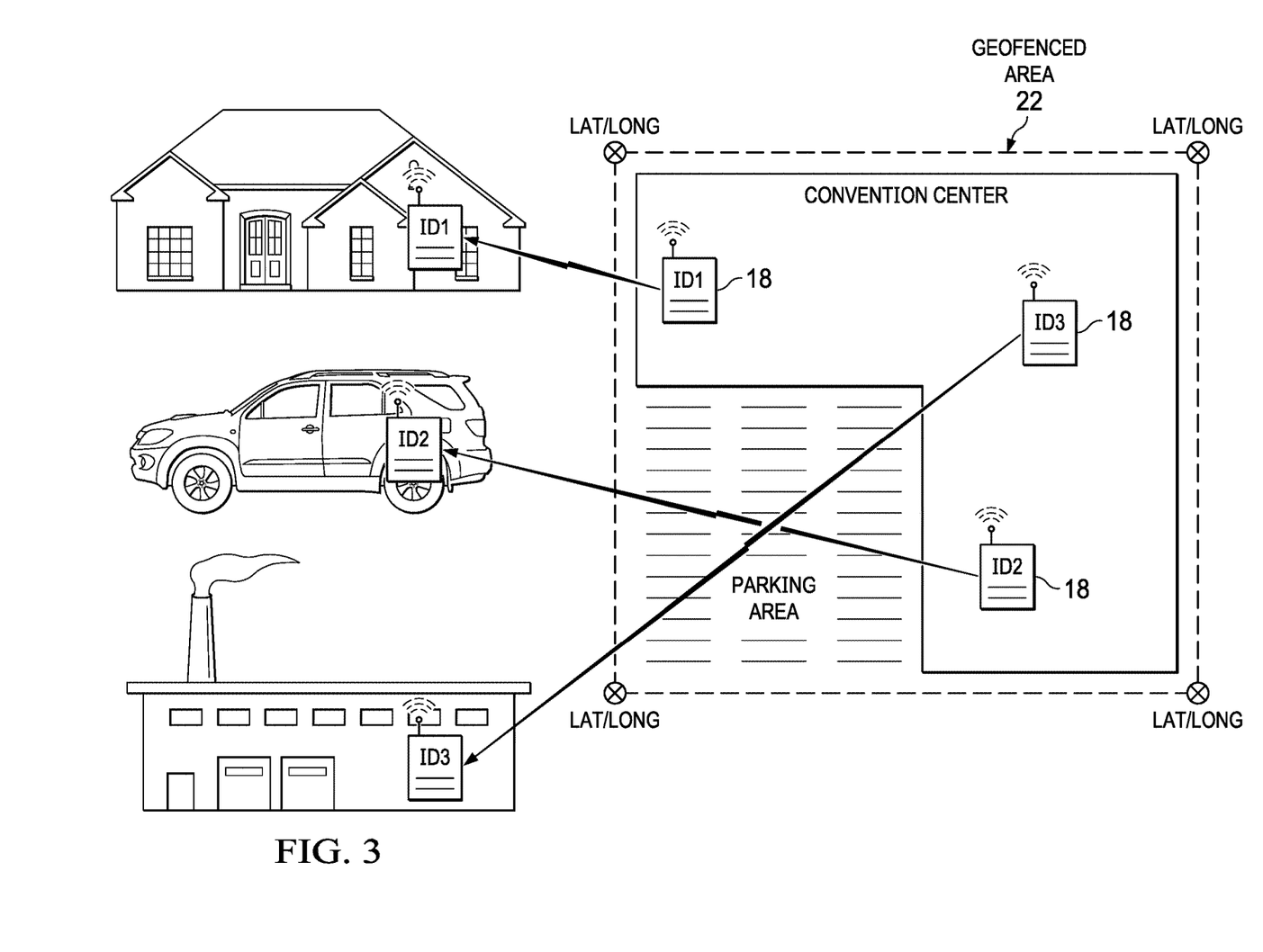
FIG. 3 illustrates exemplary geofencing.

As is illustrated, as an example without limitation, in FIG. 3, three mobile opportunity devices 18 may be isolated within a geofenced 22 convention center. The convention center, in the illustrated example, is geofenced 22 so that the advertiser 12 can locate the advertising opportunities within the space. Any size, shape, and number of geofenced areas 22 that may correspond with any number of locations may be utilized. Once the devices 18 within the geofence 22 have been labeled with an identifier (provided as ID1, ID2, and ID3 in the illustrated example, without limitation), the devices 18 may be subsequently located in other geographic areas by monitoring for bid data 20 comprising the identifier. For example, without limitation, FIG. 3 illustrates how the mobile devices 18 may be monitored as they exit the geofenced 22 convention center and travel to home, a car, and work.

In this way the modern advertiser 12 may be able to push advertising to specific customers 18 while these customers 18 travel over a period of time (e.g., hours, days, weeks, months, etc.). The initial point of discovery may be used only to identify the target devices 18 which may be subsequently observed for a period of time. As a further example, without limitation, a flower shop might geofence 22 their own establishment in order to identify their own customers 18. Throughout the following weeks, this same shop, as an advertiser 12, may push ads that identify specials and additional offers that could cause these customers 18 to return.

Figure 4:
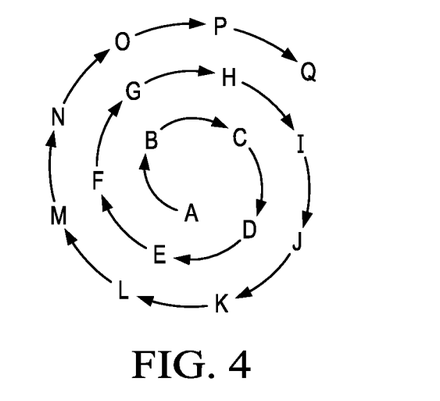
FIG. 4 illustrates an exemplary social spiral.

FIG. 4 illustrates an exemplary steady state spiral information exchange. While this exchange is illustrated in a one for one fashion; in a practical implementation, these social exchanges are rarely limited to a one for one and are most likely a one for many exchanges. Therefore, the spiral exchange may expand at a far greater rate than depicted. With sufficient social currency connected with the information, a simple exchange spiral may become the social generator for viral or contagious spreading of information. At the heart of any social exchange spiral may be information that contains content of social currency, and the spiral is generally formed by participants that are part of the same or overlapping social networks. While a spiral is illustrated, the exchange of information may take any form, with any number of individuals, having any number of connections between one another.

Figure 5:
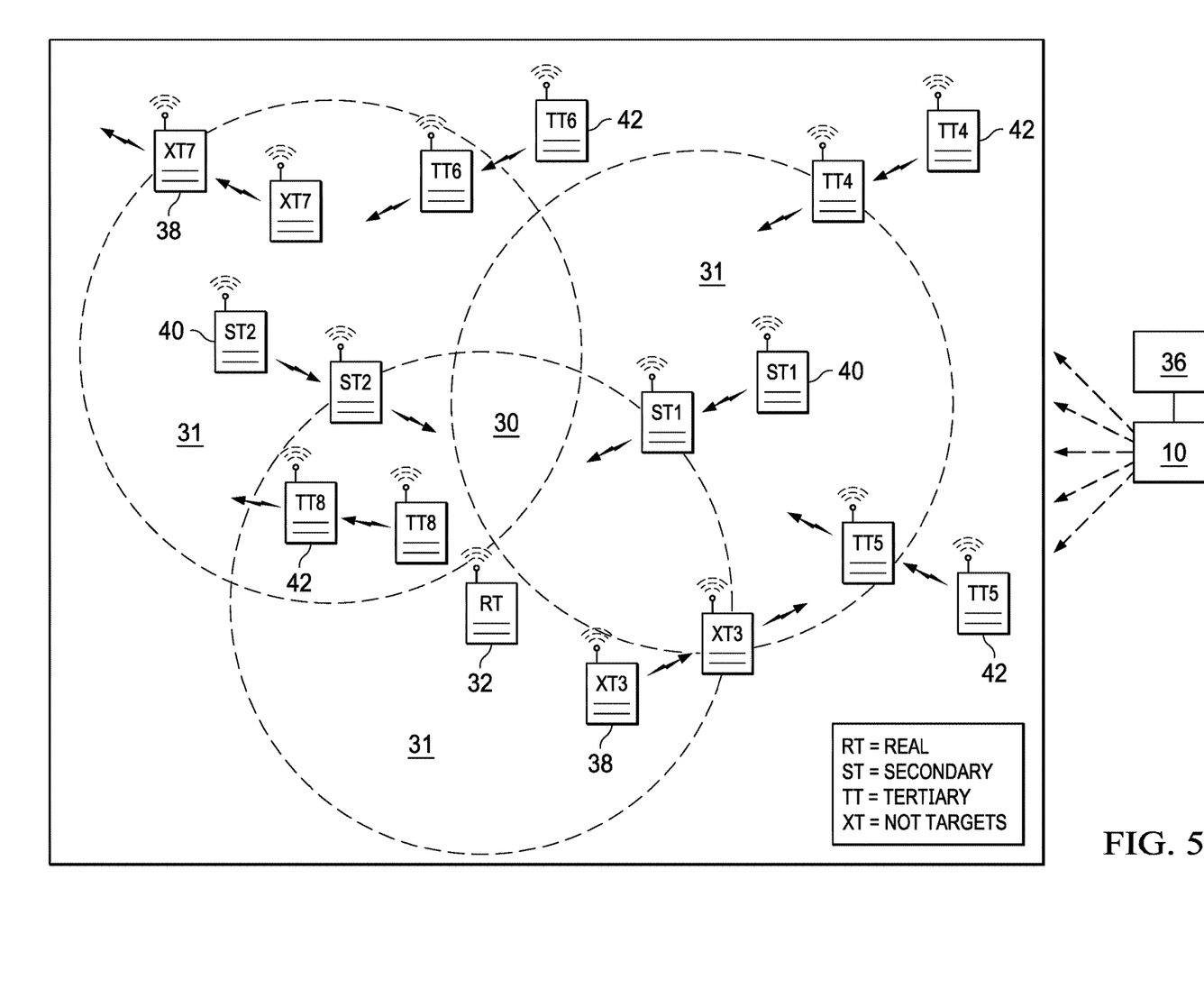
FIG. 5 illustrates an exemplary system for indirect advertising.
Figure 6:
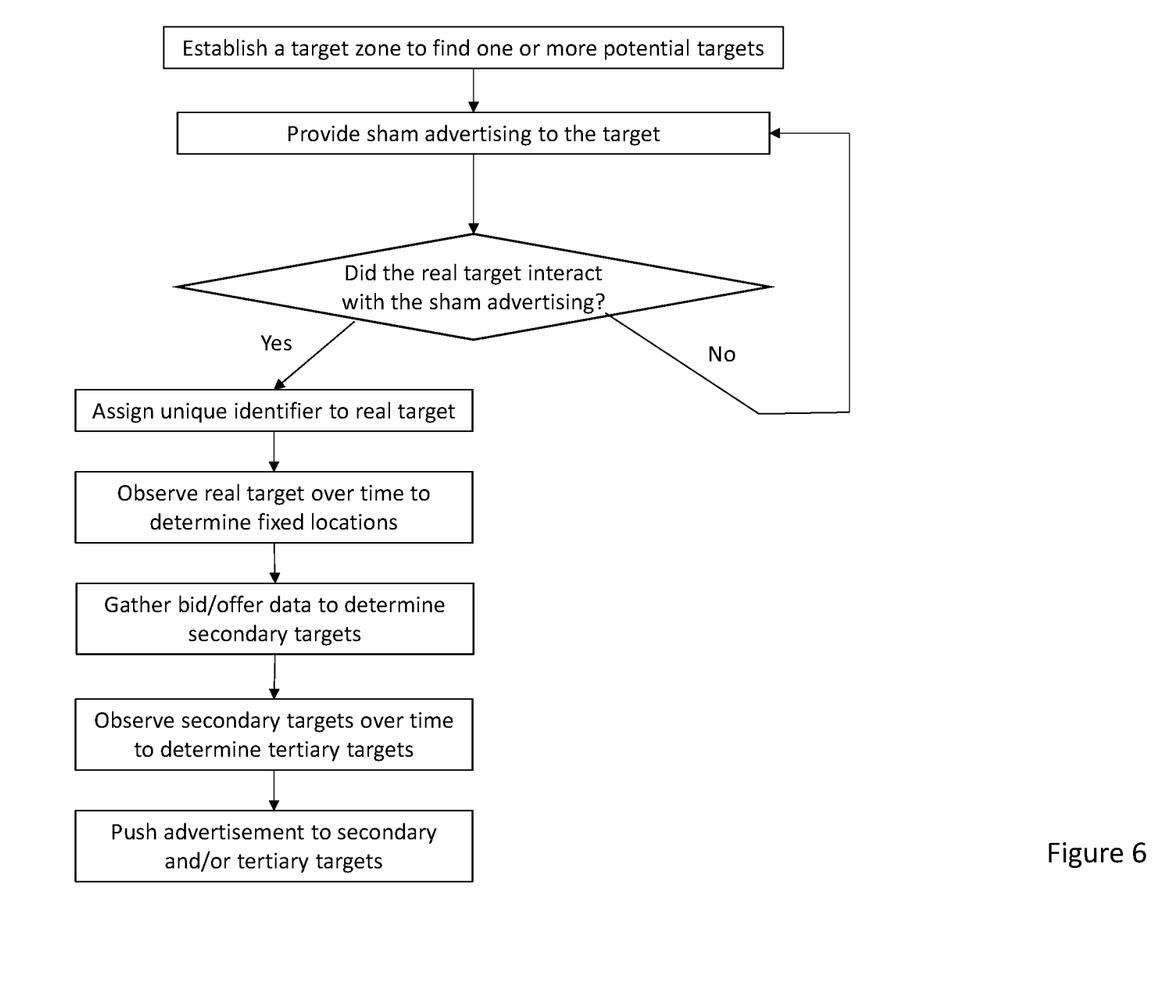
FIG. 6 illustrates an exemplary method for indirect advertising.

FIG. 5 illustrates an exemplary system for indirect advertising and FIG. 6 illustrates an exemplary method for indirect advertising. A target zone 22 may be established to capture one or more potential targets 32, 38 for an indirect advertiser 36 to indirectly advertise to. This target zone 22 may comprise a polygon or other meets-and-bounds perimeters or boundaries that defines the target zone 22 such as, but not limited to, as shown and described with respect to FIG. 3.

The target zone 22 may be a geofenced area. The target zone 22 may be defined by latitude, longitudinal coordinates that enclose to form a complete surrounding, though other measurement formats are contemplated. The central advertising provider 10 may be configured to detect potential targets entering the target zone 22. As the potential targets 32, 38 enter the target zone 22, the target's 32, 38 location may be detected as being within the target zone 22. Bid/offering data 20 for the potential target 32, 38 may be presented by the central provider 10 which may comprise location data, such as but not limited to as shown and described with respect to FIG. 2. The indirect advertiser 36 may confirm whether the potential target 32, 38 has arrived within the target zone 22 by comparing the location listed in the bid/offer 20 with that of the geofenced target zone 22.

Once the potential target 32, 38 has entered the geofenced target zone 22, the central provider 10 may determine whether the potential target 32, 38 is actually a desirable target, and thus a real target 32, that is an individual for whom indirect advertising is desired. This identification may be accomplished using sham advertising. The sham advertisement may be an advertisement that reflects the general interests of the indirect advertiser's 36 target customer. The sham advertisement may be an advertisement that is intended, designed, and/or otherwise configured solely or primarily to cause the interaction of the real target 32, preferably without revealing the future indirect advertising objective. For example, without limitation, the sham advertisement might well be informative, or simply entertaining, content that is intended, designed, and/or otherwise configured to capture the real target's 32 interests. If the potential target 32, 38 interacts with the sham advertisement, the potential target 32, 38 may be identified as the real target 32. If the potential target 32, 38 fails to interact with the sham advertisement, the potential target 32, 38 may be identified as a bypasser or non-target 38.

Once the real target 32 is identified, it is possible for the central advertiser 10 to determine demographic information about the rear target 32 through the collection of cookies or other tracking information collected from the real target's 32 mobile device. Information may be further gathered from one or more databases, clearinghouses, or the like. The wider expansion of demographic data may allow a greater quality identification of the real target 32. A unique identifier may be assigned to the real target's 32 device that may allow for further identifications of the real target's 32 mobile device within future bid/offer data.

The isolated real target 32 may be observed over a period of time, which may be extensive, though any period of time is contemplated. As the real target 32 travels, and is periodically used, future bid/offers 20 for other advertising opportunities, such as those illustrated and described with respect to FIG. 3, may be made to the real target 32. The indirect advertiser 36 may search for bid/offers 20 from the central advertiser 10 where the real target 32 is identified by use of the unique identifier previously determined. It may not even be necessary for the indirect advertiser 36 to actually bid for advertising as the received bid/offer data 20, which may comprise a location and the unique identifier, may be sufficient to determine the current location of the real target 32. In this way, the real target 32 may be tracked for any length of time and the real target's 32 locations may be continually or periodically noted. Over a sufficient period of time, the real target 32 is likely to be taken to the user's most common locations such as their home, office, gym, restaurants, bars, educational institutions, conference centers, libraries, retail establishments, and the like.

After collecting tracking data, common fixed locations 30 where the real target 32 spends longer periods of time may be identified. A fixed location 30 may include, for example without limitation, a place of work, a home, a gym, a bar/restaurant, a coffee shop, a library, an educational institution, a retail establishment, a friend's house, or other location where the latitude/longitude location remains within a given, typically relatively small, variance for a given length of time sufficient to determine the fixed location's 30 existence. Over the period of observation this list of fixed locations 30 may be collected. Such fixed locations 30 may alternatively or additionally be determined by the frequency of the real target's 32 visits to such locations 30. The fixed locations 30 may be a point or an area, such as but not limited to, a specific location measurement, a defined shape, a distance from one or more fixed points, some combination thereof, or the like.

Using each fixed location 30 as a fixed geographic are, the bid/offer data 20 may be used to build a list of secondary targets 40. A secondary target 40 may be a device which appears to be within a given proximity of the fixed location 30 and/or the real target 32 for some predetermined amount of time and/or with a predetermined frequency. For example, without limitation, the secondary target 40 may be a co-worker, family member, fellow gym goer, another bar or restaurant regular, friend, acquaintance, or the like. Social psychology has identified that friendships are formed using proximity or mere exposure, therefore, secondary targets 40 that repeatedly enter one or more geofenced areas 31 surrounding the fix location 30 are likely to be social members of the real target 32. Secondary targets 40 may be identified by their frequency and/or duration of geographic proximity to the real target 32 and/or the fixed common locations 30. A list of secondary targets 40 may be developed by their frequency and/or duration of proximity to each one of the real target's common fixed points 30 and/or the real target 32.

Information on the secondary targets 40 may be enhanced through recursive observation. Each secondary target 40 may be subsequently tracked following the same approach as described for the real target 32, though such is not required. This may permit development of a list of tertiary targets 42 that are part of the secondary target's 40 social network, while the secondary targets 40 are a part of the real target's 32 social network.

The indirect advertiser 36 may push the intended, designed, and/or otherwise configured advertisement to the secondary targets 40 and/or the tertiary targets 42. This indirect advertisement may be ultimately intended, designed, and/or otherwise configured to influence the real target 32, so the indirect advertisement may be designed to create social interest and word of mouth exchange. Since this carefully selected list of secondary and/or tertiary targets 40, 42 may be part of the social exchange spiral surrounding the real target 32, the indirect message may appear to the real target 32 to be the result of a larger viral action. However, the real target 32 may remain unaware of the relatively minimal scope of the actual exchange. This may produce a simulation of a more natural viral exchange spiral, and the real target 32 may be left unaware that the advertising is actually meant only or primarily for the real target 32.

While the systems and methods of advertising disclosed herein are highly specialized, it may produce the most effective and cost sensitive response possible. By driving advertising indirectly, the real target 32 may be less likely to qualify and reject the ultimate message. By creating the appearance of a social ground swell, there may be additional forces of conformity at play. The belief that everyone else knows and is acting upon information that is out of your control can be a powerful motivator. Therefore, this approach not only simulates a viral social exchange, but also creates the illusion of wider conformity than actually exists.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers of specialized computing device. The electronic devices may be personal computers, smartphone, tablets, databases, servers, or the like. The electronic connections described herein may be accomplished by wired or wireless means. Furthermore, the processes and steps described herein may be performed by one or more software programs and/or "bots".

What is claimed is:

1. A method of conducting an indirect advertising campaign intended to influence an intended, ultimate recipient (the "principal target") by way of a larger social exchange, said method comprising the steps of:

electronically identifying an advertising message with subject matter designed to influence the principal target for delivery to a social circle of the principal target;

electronically and automatically monitoring bid/offer data provided by one or more central advertising providers regarding advertising opportunities for spaces of webpages or applications accessed at mobile electronic devices;

electronically establishing a geofence defining a target zone;

electronically and automatically identifying the mobile electronic devices, each associated with a potential target, within the target zone by way of the monitored bid/offer data;

electronically and automatically pushing a sham advertisement to the mobile electronic devices within the target zone comprising content known to be of interest to the principal target to solicit interaction from the principal target with the sham advertisement;

electronically and automatically identifying the principal target from the potential targets by receipt of data from a particular one of the mobile electronic devices associated with the potential targets indicating interaction with the sham advertisement;

electronically and automatically determining a unique identifier for the mobile electronic device associated with the principal target from the monitored bid/offer data;

electronically and automatically recording location data in the monitored bid/offer data associated with the unique identifier;

electronically and automatically identifying fixed locations from the recorded location data where the mobile electronic device associated with the principal target has spent at least a predetermined amount of time with at least a predetermined frequency according to the recorded location data;

electronically and automatically identifying mobile electronic devices associated with secondary targets from the monitored bid/offer data associated with location data indicating a location at or within a predetermined distance of one or more of the fixed locations for a same or different predetermined amount of time with same or different predetermined frequency;

electronically and automatically purchasing, as part of the indirect advertising campaign, certain advertising opportunities at same or different ones of the one or more central advertising providers for at least some of the mobile electronic devices associated with the secondary targets; and fulfilling said certain advertising opportunities with said advertising message without purchasing advertising opportunities that are fulfilled with the advertising message for the mobile electronic device associated with the principal target so that the advertising message is capable of spreading word-of-mouth to the principal target.

2. The method of claim 1 wherein:
the webpages or applications are part of one or more social media platforms.

3. The method of claim 1 wherein:
the location data comprises latitudinal and longitudinal measurements.

4. The method of claim 1 wherein:
the advertising message is never directly pushed to the mobile electronic device associated with the principal target.

5. The method of claim 1 further comprising the steps of:
electronically and automatically determining unique identifiers for each of the mobile electronic devices associated with the secondary targets;

electronically and automatically recording location data in the monitored bid/offer data comprising the unique identifiers associated with the secondary targets;

electronically and automatically identifying secondary fixed locations from the recorded location data where any of the mobile electronic devices associated with the secondary targets spend a same or different predetermined amount of time with a same or different predetermined frequency;

electronically and automatically identifying tertiary targets by monitoring bid/offer data from same or different ones of the central advertising providers having a location within any of the secondary fixed locations for a same or different predetermined amount of time with a same or different predetermined frequency;

electronically and automatically purchasing advertising opportunities at the same or different ones of the central advertising providers for each of the mobile electronic devices associated with the tertiary targets without purchasing advertising opportunities for the mobile electronic device associated with the principal target; and electronically and automatically providing the advertising message in each one of the purchased advertising opportunities for the tertiary targets.

6. The method of claim 1 wherein:
the advertising opportunities comprise spaces within social media webpages or applications accessed by the mobile electronic devices associated with the secondary targets.

7. The method of claim 6 wherein:
the fixed locations are selected from the group consisting of: a residence, a gym, an office building, a coffee shop, a bar, a restaurant, an educational institution, a retail establishment, and a conference center.

8. The method of claim 7 wherein:
said secondary targets are selected from the group consisting of: friends, family, co-workers, patrons, and students.

9. A system for indirectly advertising to an intended, ultimate recipient (the "principal target") by simulating a larger social exchange, said system comprising:
a number of mobile devices, each associated with a user and configured to access social media webpages or applications, wherein one of said users is the principal target and the other ones of the users are secondary targets;
one or more central advertising providers in electronic communication with each of the mobile devices and configured to offer advertising opportunities for spaces at the social media webpages and applications accessed by the users at the mobile devices upon such access by the users, wherein said one or more central advertising providers are configured to automatically and electronically provide offer data for each of said advertising opportunities comprising a unique identifier specific to a respective one of the mobile devices for which the advertising opportunity is generated and location data for a respective one of the mobile devices associated with the advertising opportunity being offered based upon a location of the respective one of the mobile devices at a time the advertising opportunity is generated;

one or more electronic storage devices comprising executable software instructions, which when executed, configure one or more processors to:
monitor the offer data from the one or more central advertising providers;
establish a geofence about a target zone;
identifying, from the monitored offer data, certain of the advertising opportunities associated with certain of the location data indicating a position within the target zone;
identifying, from the identified advertising opportunities, a list of potential targets comprising the unique identifiers for the mobile devices within the target zone;
pushing, by way of the one or more central advertising providers, a sham advertisement to each of the mobile devices associated with the potential targets by purchasing certain of the advertising opportunities through the one or more central advertising providers for the mobile devices associated with the potential targets and providing the sham advertisement at the spaces associated with the purchased ones of the advertising opportunities, wherein said sham advertisement is designed to elicit interaction from the principal target by comprising information known to be of interest to the principal target;
identifying the principal target from receipt of data indicating user interaction with the sham advertisement at a particular one of the mobile devices of the potential targets at which the sham advertisement is provided;
recording location data from the monitored offer data comprising the unique identifier associated with the mobile device associated with the principal target;
developing a list of fixed locations from the recorded location data where the mobile device associated with the principal target spends at least a predetermined amount of time with at least a predetermined frequency;
recording additional unique identifiers from the monitored offer data comprising locations within a predetermined distance of one or more of the fixed locations with at least the predetermined amount of time with at least the predetermined frequency, wherein said recorded additional unique identifiers are associated with certain of the mobile devices associated with secondary targets; and
pushing, by way of the one or more central advertising providers, a specific advertising message designed to influence the principal target to each of the mobile devices associated with the secondary targets, but not to the mobile device associated with the principal target, by purchasing certain of the advertising opportunities at the one or more central advertising providers comprising the additional unique identifiers for the secondary targets for fulfilment with the specific adverting message without also purchasing the advertising opportunities comprising the unique identifier of the principal target for fulfilment with the specific advertising message as part of an advertising campaign to provide the specific advertising message at the mobile device of the secondary targets but not at the mobile device of the principal target for the advertising campaign.

* * * * *